US006758885B2

(12) United States Patent
Leffel et al.

(10) Patent No.: US 6,758,885 B2
(45) Date of Patent: Jul. 6, 2004

(54) SCREENED CARBON TRAP PROTECTION

(75) Inventors: Jeffry Marvin Leffel, Wixom, MI (US); Neville Jimmy Bugli, Novi, MI (US); Gregory Scott Green, Dearborn, MI (US); Joseph D. Bova, III, Lincoln Park, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/306,006

(22) Filed: Nov. 27, 2002

(65) Prior Publication Data

US 2003/0145732 A1 Aug. 7, 2003

Related U.S. Application Data

(60) Provisional application No. 60/355,312, filed on Feb. 7, 2002.

(51) Int. Cl.[7] ................................................ B01D 53/04
(52) U.S. Cl. .............................. 96/134; 96/147; 96/153; 55/385.3; 55/519
(58) Field of Search ........................... 55/518, 519, 523, 55/385.3; 96/108, 138, 134–136, 147, 151, 153, 154

(56) References Cited

U.S. PATENT DOCUMENTS

| | | | | |
|---|---|---|---|---|
| 1,499,864 A | * | 7/1924 | Gordon | 55/484 |
| 2,520,124 A | * | 8/1950 | Chaney et al. | 55/527 |
| 2,553,763 A | * | 5/1951 | Hammon | 55/502 |
| 3,352,294 A | * | 11/1967 | Biller et al. | 123/519 |
| 3,368,326 A | | 2/1968 | Hervert | |
| 3,406,501 A | * | 10/1968 | Watkins | 96/135 |
| 3,456,635 A | * | 7/1969 | Hervert | 123/519 |
| 3,477,210 A | * | 11/1969 | Hervert | 96/144 |
| 3,572,013 A | * | 3/1971 | Hansen | 96/138 |
| 3,572,014 A | * | 3/1971 | Hansen | 96/138 |
| 3,681,899 A | * | 8/1972 | Grote | 96/147 |
| 4,259,096 A | * | 3/1981 | Nakamura et al. | 96/138 |
| 4,261,717 A | | 4/1981 | Belore et al. | |
| 4,279,630 A | * | 7/1981 | Nakamura et al. | 96/138 |
| 4,280,360 A | | 7/1981 | Kobayashi et al. | |
| 4,375,204 A | | 3/1983 | Yamamoto | |
| 4,415,344 A | * | 11/1983 | Frost et al. | 55/523 |
| 4,418,662 A | | 12/1983 | Engler et al. | |
| 4,631,952 A | | 12/1986 | Donaghey | |
| 5,798,270 A | | 8/1998 | Adamczyk, Jr. et al. | |
| 5,875,768 A | | 3/1999 | Schenk et al. | |
| 5,898,107 A | | 4/1999 | Schenk | |
| 5,935,398 A | | 8/1999 | Taniguchi et al. | |
| 6,102,085 A | | 8/2000 | Nanaji | |

FOREIGN PATENT DOCUMENTS

| | | | |
|---|---|---|---|
| EP | 0611896 A1 | * | 8/1994 |
| EP | 1 110 593 A1 | | 6/2001 |
| GB | 2082935 A | | 3/1982 |

* cited by examiner

*Primary Examiner*—Robert H. Spitzer
(74) *Attorney, Agent, or Firm*—Brinks Hofer Gilson & Lione

(57) ABSTRACT

The present invention relates to a hydrocarbon trap positioned in the air intake system of a vehicle, upstream from the engine and wholly in the airflow. The hydrocarbon trap comprises a holder and a material for adsorbing the hydrocarbons, inserted inside the holder. The holder comprises a screen that is added at the end facing the engine. The screen is held in place with the help of a locking mechanism. The locking mechanism comprises a locking ramp on the holder and corresponding locking tab on a clamping ring surrounding the holder.

24 Claims, 4 Drawing Sheets

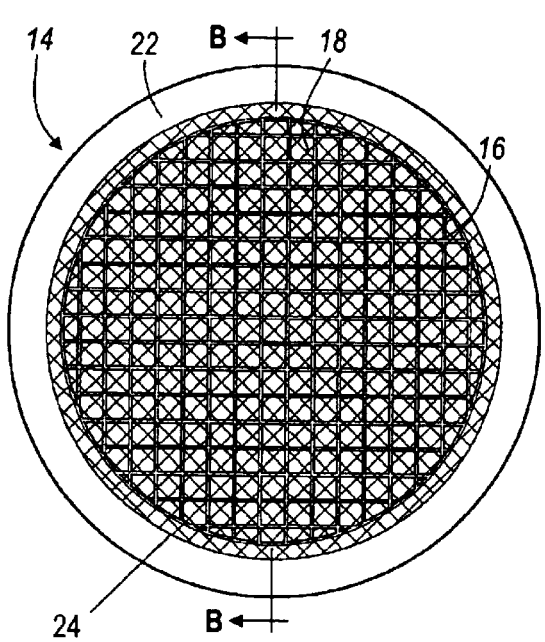
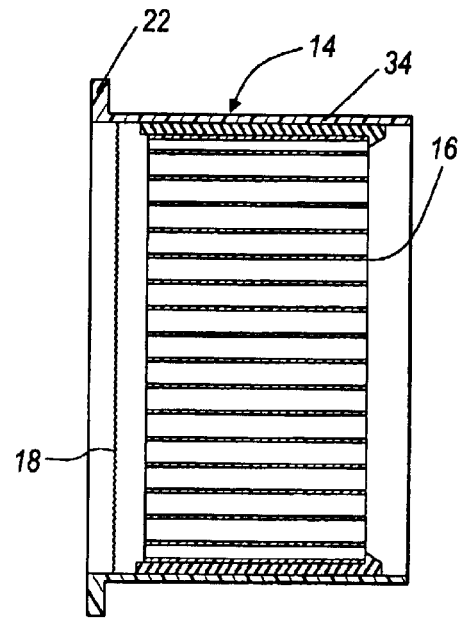
FIGURE - 3A
FIGURE - 3B
(SECTION B-B)
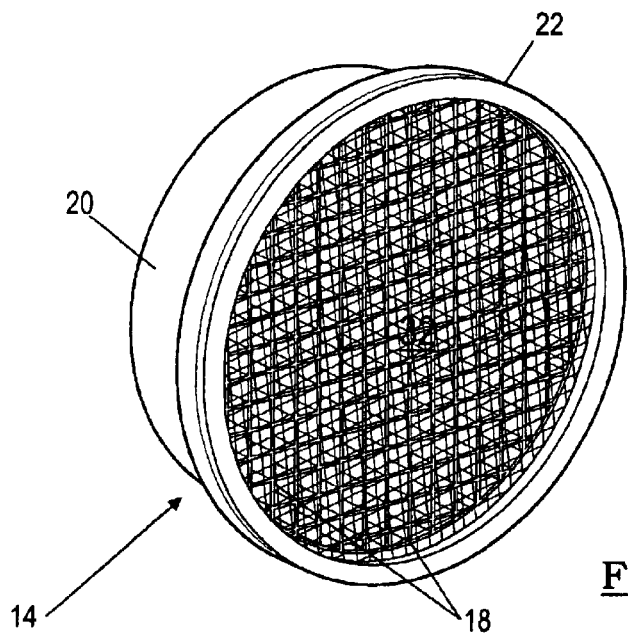
FIGURE - 4

SCREENED CARBON TRAP PROTECTION

CROSS REFERENCE TO RELATED APPLICATION

This application claims priority to U.S. Provisional Patent Application Ser. No. 60/355,312 filed Feb. 7, 2002.

TECHNICAL FIELD

The present invention relates generally to air intake systems and more particularly to a hydrocarbon trap for adsorbing hydrocarbons in the air intake systems.

BACKGROUND

Due to laws requiring the reduction of the levels of hydrocarbons that vehicles may emit into the atmosphere, it is necessary for automotive designers to include systems in vehicles to measure and control emissions. Hydrocarbons are released in a vehicle's exhaust, as well as from the engine, even when it is not operating. Hydrocarbons remaining from engine reactions can leak out of the engine through the engine's air intake.

The first step in reducing hydrocarbon emissions is to measure the level of hydrocarbons present in the engine system. Many methods have been utilized to measure the level of hydrocarbons in the exhaust. For example the hydrocarbon level in vehicle exhaust gas is measured by placing a hydrocarbon adsorbing material in the exhaust stream of the vehicle. The hydrocarbon adsorbing material is connected to a sensor. The sensor is connected to an on-board diagnostic system that monitors the exhaust emissions and notifies the operator when the hydrocarbon level exceeds a certain level. However, this method does not reduce the hydrocarbon emissions by any significant amount.

Apart from measuring the level of hydrocarbons in the exhaust, it is thus beneficial to reduce the level of hydrocarbons. One method of doing so is to absorb hydrocarbons from the exhaust flow via a filter-like device. A problem arises, however, wherein the adsorbing element eventually becomes saturated with hydrocarbons and is no longer able to function effectively. It would be beneficial to have a hydrocarbon-trapping device that would not have this limitation. Such an element could also be used to condition the air intake flow to increase engine capacity as well as for implementing a hydrocarbon-measuring feature.

Typically, the hydrocarbon-trapping device is formed of monolith carbon that is disposed in the air induction system of motor vehicles. One of the problems with such positioning of the hydrocarbon-trapping device in the air induction system is the risk of breakage due to vibrations, or due to throttle engine backfire. In addition to the loss of function of the hydrocarbon-trapping device, large pieces of carbon monolith may move towards the engine, thereby resulting in a premature failure of the engine of a motor vehicle.

Therefore, it is highly desirable to have a hydrocarbon-trapping device that substantially prevents carbon pieces from traveling to the engine. Additionally, it is also desirable to have a hydrocarbon-trapping device that enhances the hydrocarbon adsorbing.

SUMMARY

In one aspect of the present invention, a hydrocarbon trap is provided capable of adsorbing and releasing hydrocarbons and is positioned in the air intake system of a vehicle, upstream from the engine and wholly in the airflow.

In another aspect of the present invention, hydrocarbon trap comprises a housing and hydrocarbon adsorbing material, inserted inside the holder. A screen is added to the hydrocarbon trap such that in the event of premature breakage of the hydrocarbon adsorbing material the carbon particles do not flow towards the engine. In yet another aspect of the present invention, the hydrocarbon trap is provided with two screens.

In another aspect of the present invention, a hydrocarbon trap comprises a housing defining a cylindrical body. A clamping ring is attachable to the body with the help of a locking mechanism.

In yet another aspect of the present invention, the hydrocarbon trap comprises a housing, a hydrocarbon adsorbing material and two screens for protecting the hydrocarbon adsorbing material from flowing to the engine. The housing is formed by joining two cylindrical bodies. The two screens are attached to the housing, such that one screen faces the engine and the other screen faces away from the engine.

Other aspects and advantages of the present invention will become apparent upon considering the following detailed description and appended claims, and upon reference to the accompanying drawings.

BRIEF DESCRIPTION OF THE DRAWINGS

FIG. 3A is an end view of the hydrocarbon trap device of FIG. 1 in accordance with the teachings of the present invention;

FIG. 3B is a cross sectional view along lines B—B in FIG. 3A in accordance with the teachings of the present invention;

FIG. 4 is an alternate embodiment of the hydrocarbon trap device of FIG. 1 in accordance with the teachings of the present invention;

DETAILED DESCRIPTION

Figure 1:
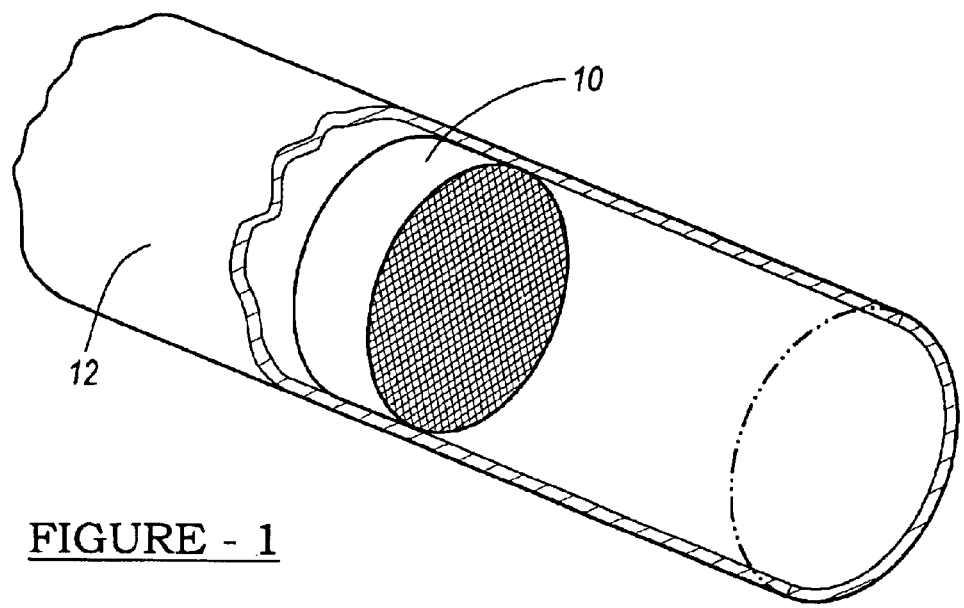
FIG. 1 is a perspective view of a hydrocarbon trap device as positioned in the air intake tube in accordance with the teachings of the present invention.
Figure 2:
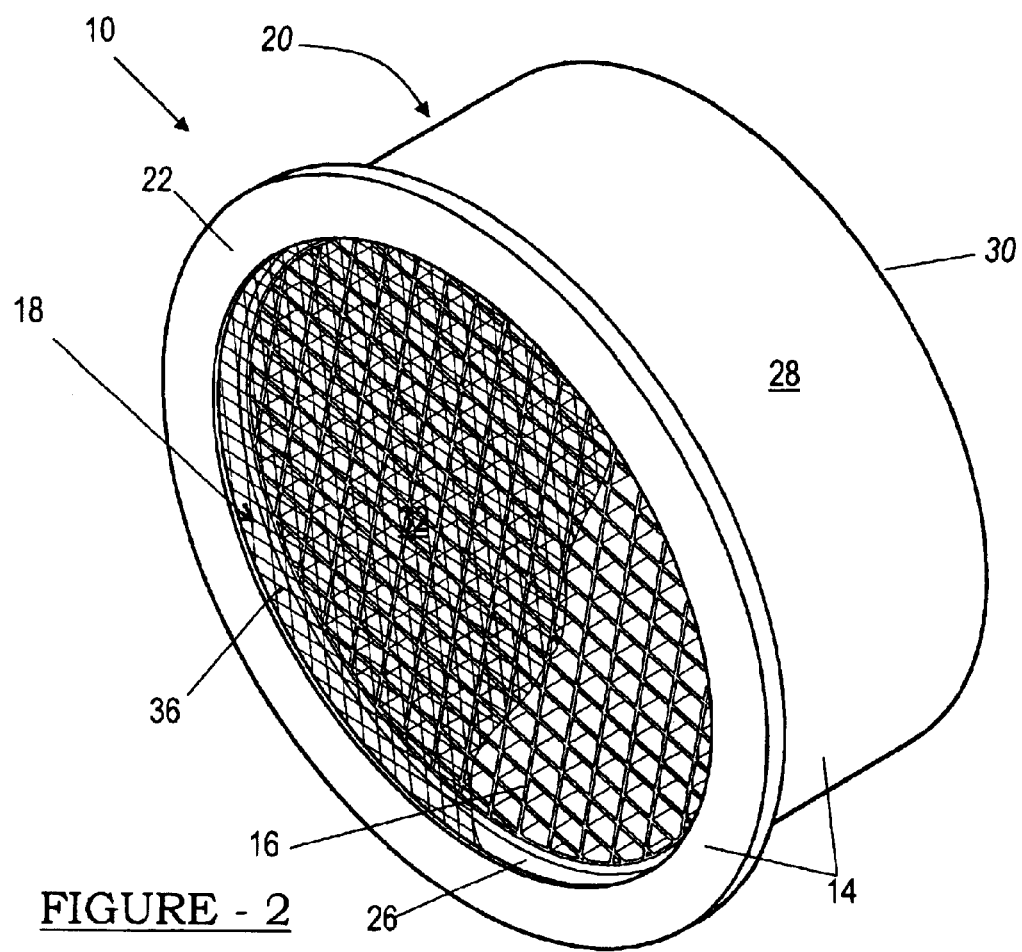
FIG. 2 is a perspective view of the hydrocarbon trap device of FIG. 1 in accordance with the teachings of the present invention.

Referring in particular to FIGS. 1 and 2, a hydrocarbon trap is generally shown and represented by reference numeral 10. The hydrocarbon trap 10, as the name suggests is able to adsorb and release hydrocarbons.

Although not shown in the drawings the hydrocarbon trap 10 is positioned in the air intake system (not shown) of a motor vehicle. An air intake system is well known in the art and is not explained in detail. Preferably, the hydrocarbon trap 10 is positioned in the air intake tube 12 between the engine (not shown) and a dust filter (not shown). The preferred position of the hydrocarbon trap 10 is upstream from the engine and wholly located in the airflow. When the engine is not operating, hydrocarbons tend to leak out of the engine system and escape the vehicle through the air intake system. Therefore, the hydrocarbon trap 10 is preferably positioned in the air intake tube 12 such that air must pass through the hydrocarbon trap 10 to escape the air intake tube 12 to the environment. When hydrocarbons are moving at a slow rate, such as when the engine is not pulling air into the air intake tube 12, the hydrocarbon trap 10 can adsorb the hydrocarbons.

Referring in particular to FIGS. 2, 3A and 3B, hydrocarbon trap 10 comprises a housing 14, a material 16 for adsorbing the hydrocarbon and a means 18 for preventing the material 16 from flowing to the engine.

The housing 14 includes a body 20 and ring 22. The ring 22 extends outwards from the perimeter 24 of the body 20 of the housing 14. Preferably, the body 20 of the housing 14 has a cylindrical shape and defines an interior surface 26 and an exterior surface 28. Preferably, the ring 22 is integral with the body 20 of the housing 14. Alternatively, the ring 22 may be attached to the body 20. A cylindrical shape for the body 20 of the housing 14 is preferred such that the housing 14 can be easily inserted in the air intake flow tube 12. Alternatively, the housing 14 may have other shapes that will allow the hydrocarbon trap 10 to be placed in the air intake flow tube 12. The housing 14 is preferably made of a metallic material such as aluminum or steel. Alternatively, the housing 14 may be made of plastic or other composite materials.

In order to explain the position of the housing 14 inside the air intake flow tube 12, an end of the body 20 housing 14 facing the dust filter is referred to as a first face and is represented by reference numeral 30. The end of the body 20 housing 14 facing the engine is referred to as a second face and is represented by reference numeral 32. Although it can not be seen clearly in the drawings, the first face 30 is open such that air passing through the air intake tube passes through the material 16. It must be understood that reference to first face 30 and second face 32, is with reference to the dust filter and the engine and is in no way intended to limit the invention. As clearly shown in FIG. 2, the ring 22 is formed on the second face 32 of the housing 14. In other words, the ring 22 faces the engine when the housing 14 is positioned inside the air intake flow tube 12.

With continued reference to FIGS. 2, 3A and 3B, the material 16 adsorbs the hydrocarbons released by the engine when the engine is not operating and release these hydrocarbons when the engine is operating. As shown, the material 16 is inserted inside the interior surface 26 of the body 20 of the housing 14 by a positive step. In order to efficiently adsorb hydrocarbons, the material 16 is entirely formed from carbon. Preferably and as shown in FIG. 2, the material 16 is a carbon monolith having a honeycomb structure. The honeycomb construction of the material 16 will allow air to pass through the material 16 when the engine is turned on and release hydrocarbons into the engine. Alternatively, the material 16 could be constructed from carbon mixed with a binder material such as gray clay or ceramic. As clearly shown in FIG. 3B, in order to prevent the material 16 from any substantial damage due to harsh environment, the interior surface 26 of the body 20 of the housing 14 is provided with a cushion ring 34. The cushion ring 34 surrounds the material 16 and is preferably formed of a urethane or a foam material.

The preferred embodiment of the material 16 is also self-regenerating. Rather than adsorbing hydrocarbons and trapping them in until the material 16 is saturated, the hydrocarbons may be relatively easily released from the hydrocarbon trap 10. The release occurs when the engine is operating and pulling air into the air intake tube 12 at a moderate to high rate. Preferably, when air passes through the hydrocarbon trap 10 at a moderate to high rate, the hydrocarbons trapped in the material 16 are pulled out and travel down the air intake tube 12 to the engine, where they are burned off. By allowing the hydrocarbons to be released from the material 16, the preferred embodiment of the invention is self-regenerating, and the material 16 does not have to be replaced over the lifetime of the vehicle as a result of hydrocarbon build-up.

With continued reference to FIGS. 2, 3A and 3B, the hydrocarbon trap 10 is also provided with a means 18 such as a screen for preventing the material 16 from flowing to the engine, in situations where there is premature breakage of the housing 14. Preferably, the screen 18 is attached on the second face 32 of the housing 14. Alternatively, as shown in FIG. 4, the screen 18 may be attached on both the first face 30 and the second face 32 of the body 20 of the housing 14.

As clearly shown in FIG. 3A, the screen 18 has a spherical shape such that it can be placed against the perimeter 24 of the body 20 of the housing 14. As shown in FIG. 3A, the screen 18 defines chambers or tiny holes 36 to allow air and hydrocarbons to pass through the screen 18. However, the size of the holes 36 in the screen 18 is such that they will prevent any large pieces of material 16 from flowing towards the engine. Preferably, the screen 18 is formed of steel wires. Alternatively, the screen 18 may be made of other materials such as plastic. As clearly shown in FIG. 3A, the screen 18 is attached to the housing 14 by welding the screen 18 against the perimeter 24 of the body 20 of the housing 14. Traditional welding methods such as heat staking, laser welding etc. may be used to attach the screen 18 to the housing 14.

Figure 5:
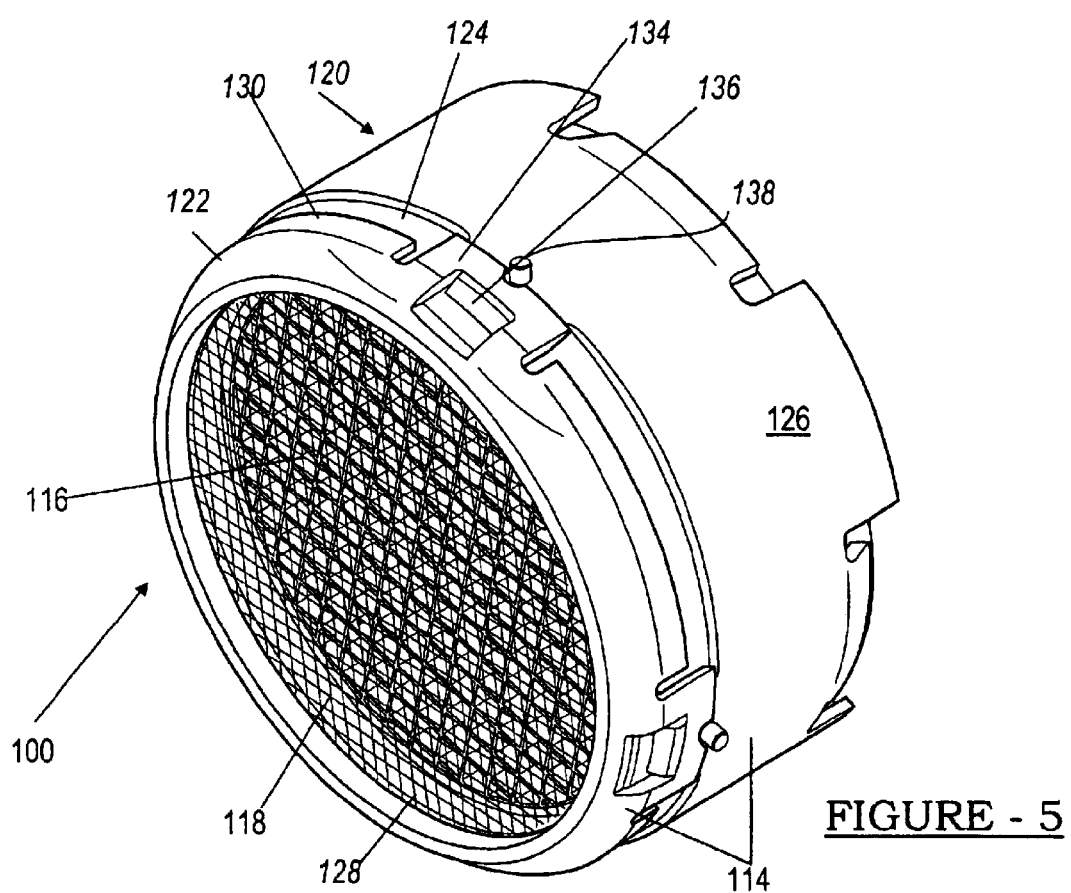
FIG. 5 is a perspective view of the third embodiment of the hydrocarbon trap device in accordance with the teachings of the present invention.

FIG. 5 represents an alternate embodiment of the hydrocarbon trap shown and described in FIG. 2. Like the hydrocarbon trap of the first embodiment, the hydrocarbon trap 100 comprises a housing 114, a material 116 for adsorbing hydrocarbon and a means 118 for preventing the material 116 from flowing to the engine. The housing 114 is formed of a body 120 with a clamping ring 122 clamped around the perimeter 124 of the cylindrical body 120. Like the first embodiment, the body 120 of the housing 114 is cylindrical in shape such that it can be positioned inside an air intake tube. The cylindrical body 120 defines an exterior surface 126 and an interior surface 128. Preferably, the clamping ring 122 is formed of the same material as the body 120 of the housing 114. Alternatively, it may be formed of a different material.

In order to attach the clamping ring 122 to the body 120 of the housing 114, the clamping ring 122 defines an outwardly extending flange 130. As shown in FIG. 5, the outwardly extending flange 130 has a larger diameter than the diameter of the body 120 such that it fits partially over the body 120. The flange 130 has at least one locking device 134 extending from the flange 130. The body 120 of the housing is provided with a corresponding locking ramp 136. As clearly shown in FIG. 5, the locking device 134 and the locking ramp 136 are snap fitted together such that the clamping ring 122 is tightly clamped around the exterior surface 126 of the body 120. Preferably, the locking ramp 136 is non-planar and defines a non-flat profile seat. The screen 118 is placed against the perimeter 124 of the body 120 and is held in place between the locking ramp 136 and the locking device 134. The clamping ring 122 is tightened around body 120 of the housing 114 with the help of fasteners or by welding/heat staking. Additionally, as shown in the FIG. 5 the exterior surface 126 of the body 120 may define a heat staked rivet 138 that will hold the clamping ring 122 to the body 120 of the housing 114. The heat staked rivet 138 will prevent any pre-mature detachment of the clamping ring 122 from the body 120. As seen from above, this arrangement imparts radial strength to the screen 118 such that the collapse strength of the hydrocarbon trap 100 is enhanced.

Figure 6:
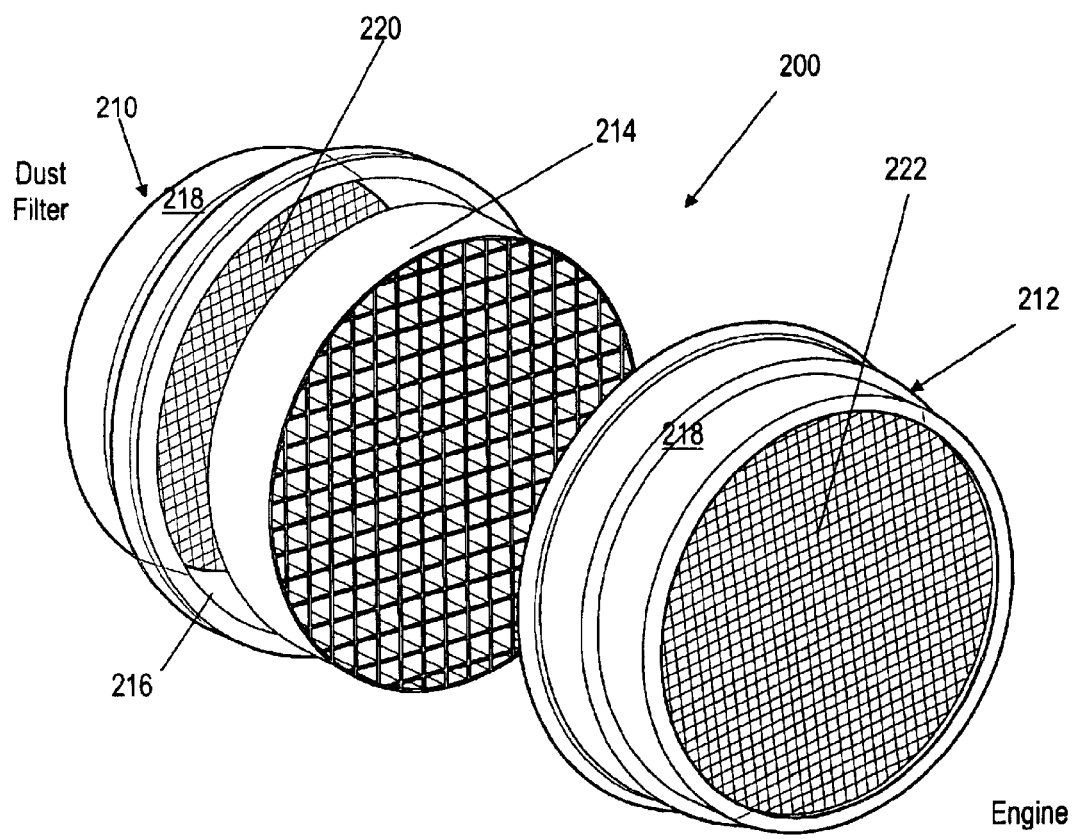
FIG. 6 is a perspective view of the fourth embodiment of the hydrocarbon trap device in accordance with the teachings of the present invention.

FIG. 6 represents a third embodiment of the hydrocarbon trap 10 shown in FIG. 2. As shown in the FIG. 6 the hydrocarbon trap 200 comprises two cylindrical housings 210 and 212. Like the first embodiment, the hydrocarbon trap 200 comprises a material 214 for adsorbing hydrocarbons. Each housing 210, 212 defines an interior surface 216 and an exterior surface 218. The housings 210 and 212 are provided with screens 220 and 222. As dearly seen in FIG. 6, one screen 220 faces the dust filter and the other screen 222 faces the engine. The material 214 is inserted into the interior surface 216 of the housings 210 and 212, such that the material 214 is between the screens 220 and 222. Preferably, the screens are attached to the housings by the method described in the first embodiment. Alternatively, the locking mechanism described In the third embodiment may be used to attach the screens 220 and 222 to the housings 210 and 212. The two cylindrical holders 210 and 212 are attached to each other with the help of fasteners or alternatively by spin welding them together.

As seen from the above, the present invention provides for a hydrocarbon trap that is more stable and substantially prevents large pieces of carbon from traveling to the engine. Secondly, the hydrocarbon trap of the present invention also provides for adsorption of hydrocarbons when the engine is not running, thereby reducing the amount of hydrocarbons released into the atmosphere.

While the invention has been described in terms of preferred embodiments, it will be understood, of course, that the invention is not limited thereto since modifications may be made by those skilled in the art, particularly in light of the foregoing teachings.

What is claimed is:

1. A hydrocarbon trapping device positioned in the air intake system of an engine, wherein the device is placed upstream from the engine, the device comprising:

a housing having a body with a first end and a second end, wherein the engine is closer to the first end of the body than to the second end of the body;

at least one element having a circumference, the circumference substantially surrounded by the body of the housing, for adsorbing hydrocarbons released by the engine; and a first screen connected to the housing adjacent to the first end of the body for preventing the element from flowing to the engine.

2. The device of claim 1, wherein the body is cylindrical.

3. The device of claim 1, wherein the element has a plurality of chambers defined therein, the chambers arranged so as to allow air to pass through the element.

4. The device of claim 3, wherein the chambers are arranged in a honeycomb pattern.

5. The device of claim 3, wherein the first screen comprises a plurality of holes to allow air to pass through, wherein the plurality of holes are smaller than the plurality of chambers in the element.

6. The device of claim 1, wherein the element is a carbon element.

7. The device of claim 1, wherein the first screen is connected to the body of the housing.

8. The device of claim 1, wherein the first screen is a wire mesh screen.

9. The device of claim 1, wherein the first screen is made of a material consisting of aluminum, steel and plastic.

10. The device of claim 1, further comprising a second screen attachable to the second end of the body.

11. The device of claim 1 further comprising a cushion ring including a compliant material and substantially located between the housing and the element.

12. The device of claim 1, further including a second screen coupled with the body.

13. A hydrocarbon trapping device positioned in the air intake system of an engine, wherein the device is placed upstream from the engine, the device comprising:

a housing having a body with a first end and a second end, wherein the engine is closer to the first end of the body than to the second end of the body;

an element housed in the body of the housing for adsorbing hydrocarbons released by the engine;

a screen coupled with the body; and a clamping ring attachable around a perimeter of the body of the housing;

wherein the screen is inserted between an end of the clamping ring and one of the first and second ends of the body.

14. The device of claim 13, wherein the clamping ring is attachable to the body by a locking mechanism.

15. The device of claim 14, wherein the locking mechanism comprises a locking tab on the clamping ring and a locking ramp on the body, such that the locking tab snap fits into the locking ramp.

16. The device of claim 15, further including a fastener connecting the locking mechanism to the body, wherein the fastener is selected from the group consisting of a heat-staked material, a spin-welded material, a fastener, and a laser-welded material.

17. The device of claim 13 further comprising a cushion ring including a compliant material and substantially located between the housing and the element.

18. A hydrocarbon trapping device positioned in an air intake system of an engine, wherein the device is positioned upstream from the engine, the device comprising:

a housing, wherein the housing defines an inner perimeter surface, a first face facing the engine, and a second face facing away from the engine;

an element having a circumference, the element configured to adsorb hydrocarbons, wherein the inner perimeter surface of the housing surrounds the circumference of the element between the first face and the second face;

a first screen attachable to the first face of the housing; and a cushion ring surrounding the circumference of the element substantially between the housing inner surface and the element, the cushion ring comprising a compliant material.

19. The device of claim 18, wherein the housing is formed of two cylindrical bodies having a hollow interior.

20. The device of claim 18, wherein the element has a plurality of chambers defined therein, the chambers arranged so as to allow air to pass through the element.

21. The device of claim 20, wherein the chambers are arranged in a honeycomb pattern.

22. The device of claim 20, wherein the element is a carbon element.

23. The device of claim 18, wherein the first screen is made of a material consisting of aluminum, steel and plastic.

24. The device of claim 18, wherein the compliant material is selected from the group consisting of urethane and foam.

* * * * *

UNITED STATES PATENT AND TRADEMARK OFFICE
CERTIFICATE OF CORRECTION

PATENT NO. : 6,758,885 B2
DATED : July 6, 2004
INVENTOR(S) : Jeffry M. Leffel et al.

It is certified that error appears in the above-identified patent and that said Letters Patent is hereby corrected as shown below:

<u>Title page,</u>
Item [56], References Cited, U.S. PATENT DOCUMENTS, insert the following:

| | | | |
|---|---|---|---|
| -- 4,786,298 | 11/1988 | Billiet et al. | 96/138 |
| 4,886,533 | 12/1989 | Sakashita et al. | 55/498 |
| 6,464,761 | 10/2002 | Bugli, Neville Jimmy | 96/135 |
| 6,497,756 | 12/2002 | Curado et al. | 96/117.5 |
| 2002/0029693 | 03/2002 | Sakakibara et al. | 96/134 |
| 2002/0124733 | 09/2002 | Iriyama et al. | 96/134 |
| 2002/0129711 | 09/2002 | Oda et al. | 96/134 |
| 2003/0066427 | 04/2003 | Ishida, Kosaku | 96/135 |
| 2003/0101871 | 06/2003 | Scardino et al. | 95/279 |
| 2003/0136267 | 07/2003 | Ku, Joseph P. | 96/135 --. |

Signed and Sealed this

Twenty-first Day of December, 2004

JON W. DUDAS
*Director of the United States Patent and Trademark Office*